(12) United States Patent
Vermeersch et al.

(10) Patent No.: US 7,749,135 B2
(45) Date of Patent: Jul. 6, 2010

(54) IGNITION AND TRANSMISSION SHIFT LEVER INTERLOCK SYSTEM

(75) Inventors: Michael C. Vermeersch, Saginaw, MI (US); Gregory P. Ruth, Birch Run, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 474 days.

(21) Appl. No.: 11/900,535

(22) Filed: Sep. 12, 2007

(65) Prior Publication Data

US 2009/0069152 A1  Mar. 12, 2009

(51) Int. Cl.
*F16H 59/74* (2006.01)
*B60K 20/00* (2006.01)
*B60R 25/06* (2006.01)

(52) U.S. Cl. .................. 477/99; 74/473.24; 70/247
(58) Field of Classification Search ............ 477/99, 477/101; 74/473.1, 473.13, 473.21, 473.24, 74/473.25; 180/271; 70/245, 247
See application file for complete search history.

(56) References Cited

U.S. PATENT DOCUMENTS

| | | | |
|---|---|---|---|
| 4,520,640 A | 6/1985 | Kramer | |
| 4,724,722 A | 2/1988 | Beauch et al. | |
| 4,854,193 A | 8/1989 | Newman et al. | |
| 4,887,702 A * | 12/1989 | Ratke et al. | 477/96 |
| 5,050,411 A * | 9/1991 | Kawachi et al. | 70/248 |
| 5,445,575 A | 8/1995 | Sundeen | |
| 5,522,279 A | 6/1996 | Kataumi | |
| 5,624,352 A | 4/1997 | Smale | |
| 5,729,187 A | 3/1998 | Moody et al. | |
| 5,752,414 A | 5/1998 | Reasoner et al. | |
| 5,860,303 A | 1/1999 | Droz et al. | |
| 5,902,209 A * | 5/1999 | Moody | 477/99 |
| 6,196,078 B1 | 3/2001 | DeJonge et al. | |
| 6,768,221 B2 | 7/2004 | Klinger et al. | |
| 7,559,874 B2 * | 7/2009 | Fischer et al. | 477/99 |

* cited by examiner

*Primary Examiner*—Roger Pang
(74) *Attorney, Agent, or Firm*—Cantor Colburn LLP

(57) ABSTRACT

The interlock system includes a shaft that defines a longitudinal axis which the shaft rotates about during transmission shift operations. A transmission shift lever is coupled to the shaft, and an inhibitor pin is coupled to the ignition switch by a cable. The inhibitor pin engages the transmission shift lever to prevent shift operations when the ignition switch is in the off position. The inhibitor pin disengages the transmission shift lever when the ignition switch is positioned in the accessory position or a start/run position. The shaft includes a recess into which the inhibitor pin extends when the shaft is in the neutral or drive position to permit disconnection of the accessory circuit by moving the ignition switch to a mid position (between the off position and the accessory position) without placing the shaft in the park position.

11 Claims, 7 Drawing Sheets

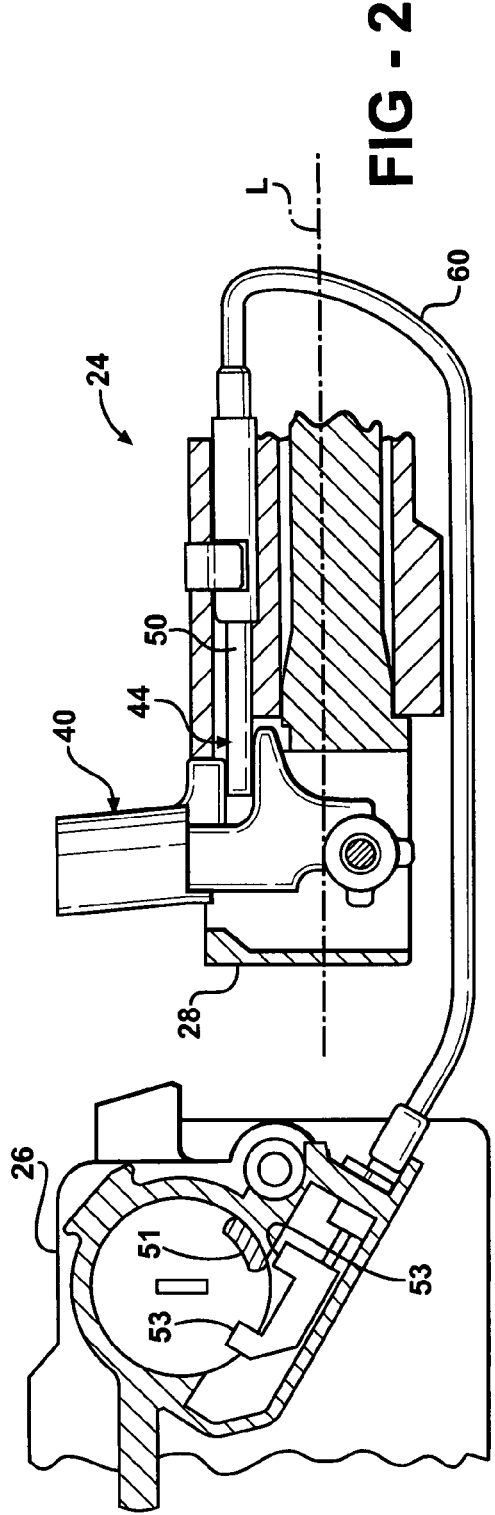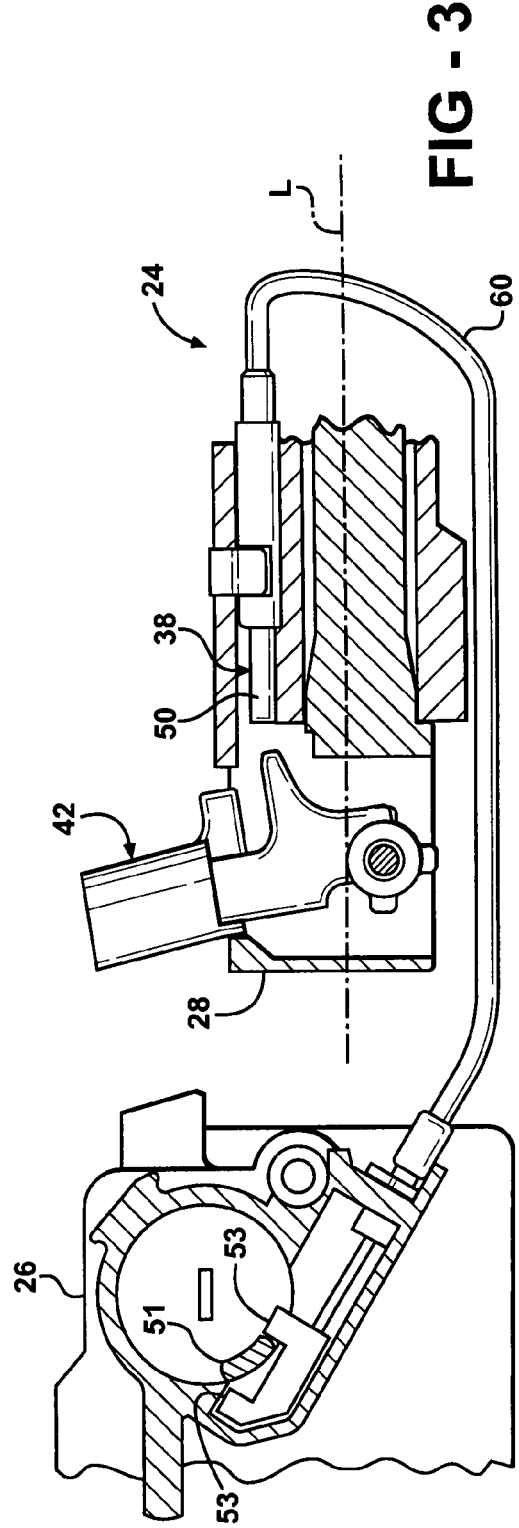

IGNITION AND TRANSMISSION SHIFT LEVER INTERLOCK SYSTEM

BACKGROUND OF THE INVENTION

1. Field of the Invention

The subject invention relates to an ignition and transmission shift lever interlock system for a vehicle, and more specifically to an interlock system that prohibits removal of an ignition key from an ignition switch while permitting disconnection of an accessory circuit with a transmission shift lever and shaft of the vehicle in a neutral position or a drive position.

2. Description of the Prior Art

Vehicles including an automatic transmission currently include an ignition transmission shift lever interlock system to prevent movement of a transmission shift lever out of a park position unless the key is in an ignition switch and the ignition switch is unlocked, i.e., in an accessory position or in a start/run position.

The interlock system comprises a shaft, which defines a longitudinal axis. The shaft is rotatable about the longitudinal axis between at least a park position, a neutral position, and a drive position. The transmission shift lever is pivotably coupled to the shaft and is pivotably moveable relative to the shaft between a restrained position and a release position. The shaft is rotatably moveable between the park position, the neutral position, and the drive position when the transmission shift lever is in the release position. The shaft is restrained in the park position when the transmission shift lever is in the restrained position. The ignition switch includes at least an off position, an accessory position, a start position, and a run position. The ignition switch is only moveable into the off position when the shaft is in the park position. An inhibitor pin is coupled to the ignition switch by a push/pull cable. The inhibitor pin is stationary relative to rotation of the shaft about the longitudinal axis, and is moveable along the longitudinal axis between a lock position and an unlock position. In the lock position, the inhibitor pin is engaged with the transmission shift lever when the ignition switch is positioned in the off position. In the unlock position, the inhibitor pin is disengaged from the transmission shift lever when the ignition switch is positioned in the accessory position. The vehicle draws an electrical current from an accessory circuit when the ignition switch is in the accessory position. The accessory circuit is disconnected when the inhibitor pin is moved axially along the longitudinal axis into the lock position.

Vehicles also usually include a key removal inhibitor system. The key removal inhibitor system prevents the removal of the key from the ignition switch when the transmission is not in the park position.

Certain manufacturing facilities require the transmission of the vehicles and thereby the transmission shift lever and the shaft, to be positioned in the neutral position for movement along a production line. In order to place the transmission in the neutral position, the ignition key is inserted into the ignition switch and turned to the accessory position, thereby unlocking the ignition switch. Upon unlocking the ignition switch, the inhibitor pin is moved into the unlocked position and the transmission shift lever is released from the restrained position, thereby permitting a user to shift the transmission of the vehicle into the neutral position by rotating the transmission shift lever and the shaft about the longitudinal axis. Once the shaft is rotated about longitudinal axis, the inhibitor pin abuts the shaft, preventing the inhibitor pin from moving along the longitudinal axis into the lock position, thereby preventing disconnection of the accessory circuit. As a result, the ignition switch is locked in the accessory position, and the vehicle continuously draws the electrical current from the accessory circuit. Continued draw of the electrical current results in discharge of the vehicle battery, which is not desirable. It would therefore be desirable to have the capability to disconnect the accessory circuit while the transmission shift lever and the shaft are in the neutral position while maintaining the integrity of the key removal inhibitor system.

SUMMARY OF THE INVENTION AND ADVANTAGES

The subject invention provides an ignition and transmission shift lever interlock system for a vehicle. The interlock system comprises a shaft, which defines a longitudinal axis. The shaft is rotatable about the longitudinal axis between at least a park position, a neutral position, and a drive position. A transmission shift lever is pivotably coupled to the shaft and is pivotably moveable between a restrained position and a release position. The shaft is rotatably moveable between the park position, the neutral position, and the drive position when the transmission shift lever is in the release position. The shaft is restrained in the park position when the transmission shift lever is in the restrained position. An ignition switch includes at least an off position, an accessory position, and a mid position between the off position and the accessory position. The ignition switch is only moveable into the off position when the shaft is in the park position. The accessory position draws an electrical current. An inhibitor pin is coupled to the ignition switch. The inhibitor pin is stationary relative to rotation of the shaft about the longitudinal axis and is moveable along the longitudinal axis between a lock position and an unlock position. In the lock position, the inhibitor pin is engaged with the transmission shift lever when the ignition switch is positioned in the off position. In the unlock position, the inhibitor pin is disengaged from the transmission shift lever when the ignition switch is positioned in the accessory position and the mid position. The shaft defines a recess. The inhibitor pin is moveable into the recess to an intermediate position, between the lock position and the unlock position, when the shaft is rotated into one of the neutral position and the drive position. Moving the inhibitor pin into the intermediate position permits interruption of the electrical current in response to movement of the ignition switch into the mid position.

Accordingly, the transmission shift lever and the shaft may be positioned in a neutral gear or a drive gear and the ignition switch placed in the mid position to disconnect an accessory circuit and stop the draw of the electrical current, while still preventing removal of a key from the ignition switch. This is accomplished by moving the inhibitor pin into the recess far enough to simulate the inhibitor pin being moved into the lock position, thereby disconnecting the accessory circuit.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a cross-sectional view of an ignition transmission shift lever inhibitor system showing the transmission shift lever in a restrained position;

FIG. 3 is a cross sectional view of the ignition transmission shift lever inhibitor system showing the transmission shift lever in a released position;

DETAILED DESCRIPTION OF THE INVENTION

Figure 1:
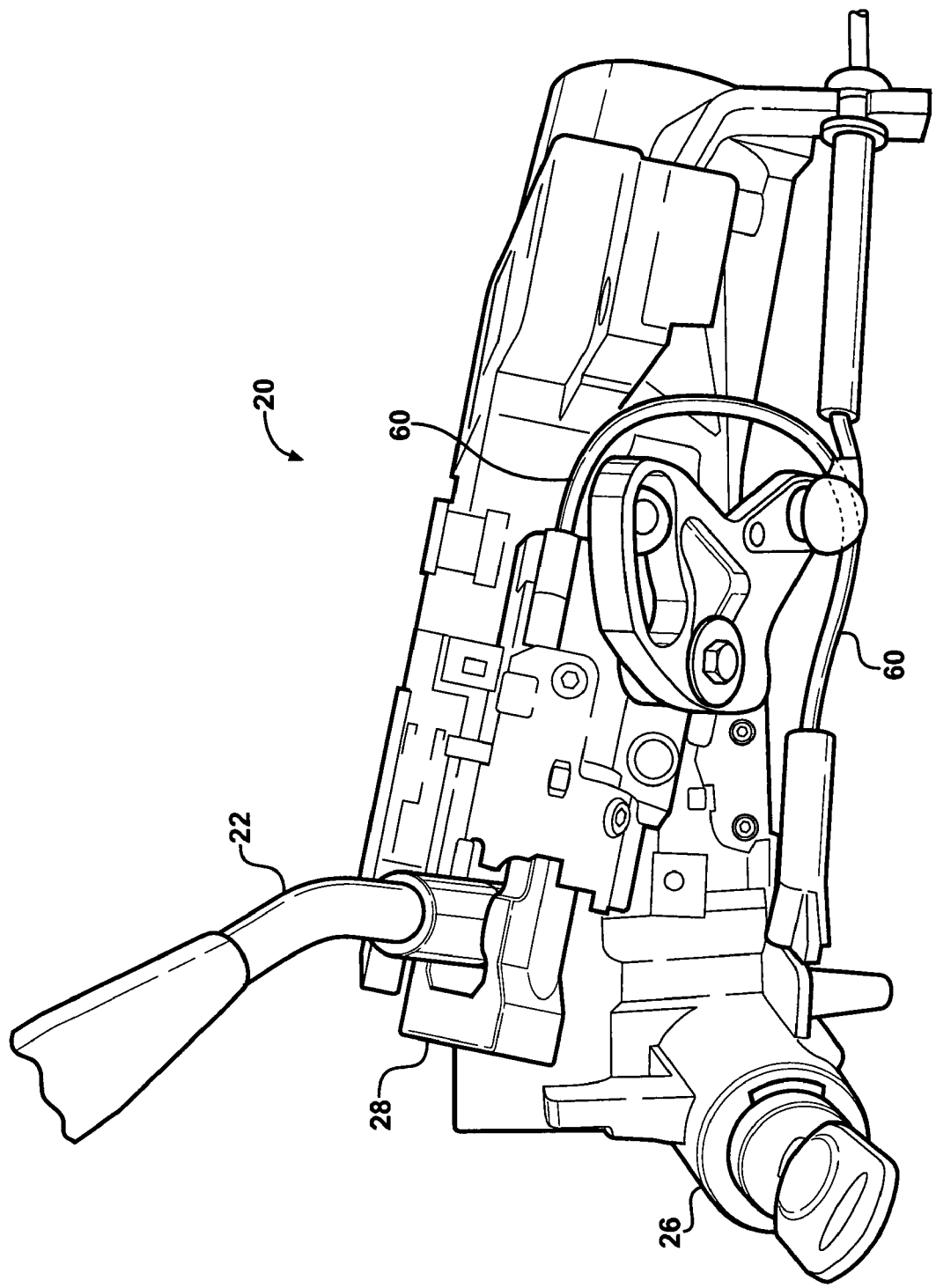
FIG. 1 is a perspective view of a steering column assembly.

Referring to the Figures, wherein like numerals indicate corresponding parts throughout the several views a steering column assembly is shown generally at 20 in FIG. 1. The steering column assembly 20 as described herein is intended for use in a vehicle having an automatic transmission and a column mounted transmission shift lever 22. The steering column assembly 20 is incorporated into the vehicle as is well known in the art, and includes an ignition and transmission shift lever interlock system generally shown at 24 in FIG. 2.

Figure 6:
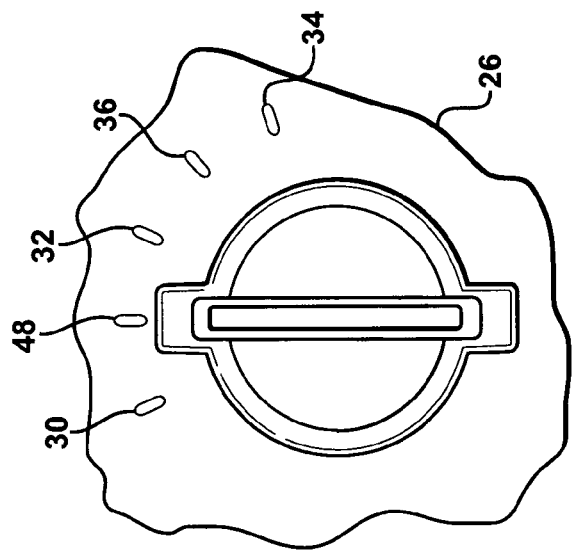
FIG. 6 is a fragmentary plan view of the ignition switch showing the various positions of the ignition switch.
Figure 7:
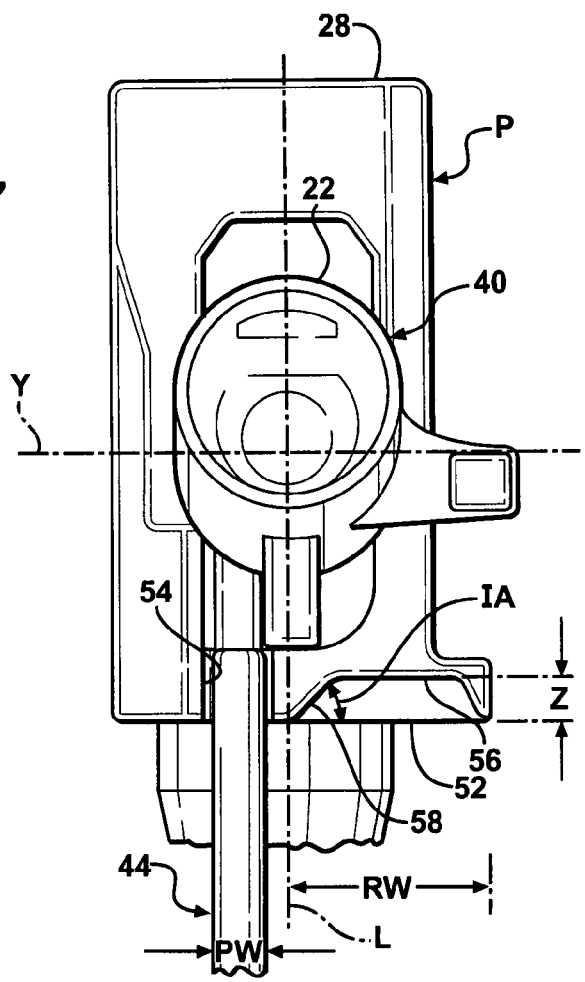
FIG. 7 is a fragmentary plan view showing the shaft in the park position and the inhibitor pin in the lock position and engaged with the transmission shift lever in the restrained position.

Referring to FIGS. 2 and 3, the interlock system 24 comprises an ignition switch 26, and further comprises the transmission shift lever 22 coupled to a shaft 28. Referring also to FIG. 6, the interlock system 24 prevents the transmission shift lever 22 and the shaft 28 from moving when the ignition switch 26 is in an off position 30, i.e., the ignition switch 26 must be turned on to an accessory position 32, a start position 34, or a run position 36 to unlock 38 the transmission shift lever 22 and the shaft 28 to permit movement thereof. The ignition switch 26 includes a key removal inhibitor system as is well known in the art, which prevents removal of an ignition key when the transmission shift lever 22 and the shaft 28 are not in a park position P, i.e., the transmission shift lever 22 and the shaft 28 must be in the park position P, as shown in FIGS. 7, 8, and 9, and the ignition switch 26 must be in an off position 30 to remove the key from the ignition switch 26.

Figure 4:
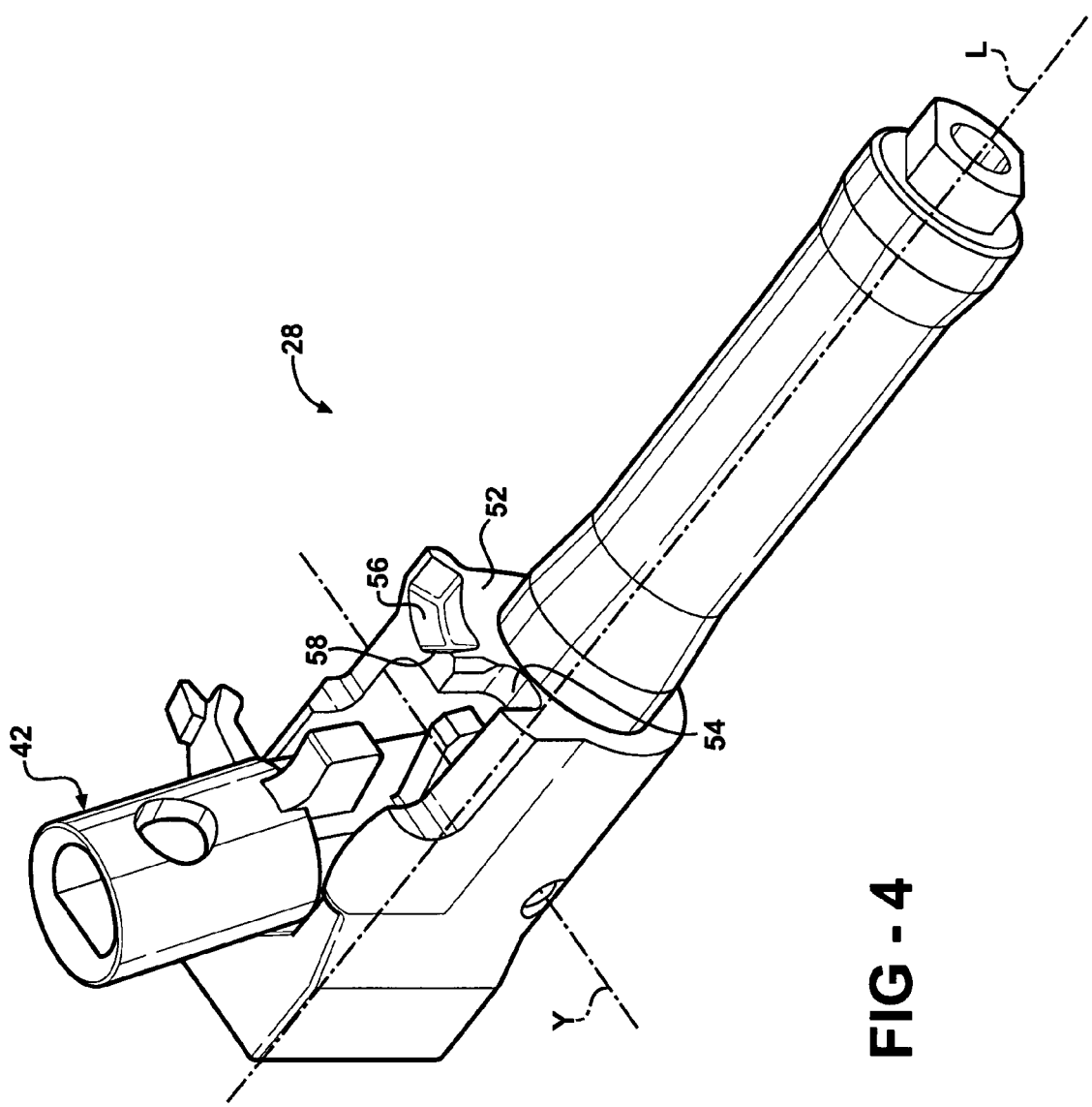
FIG. 4 is a perspective view of a shaft and the transmission shift lever in the released position.
Figure 5:
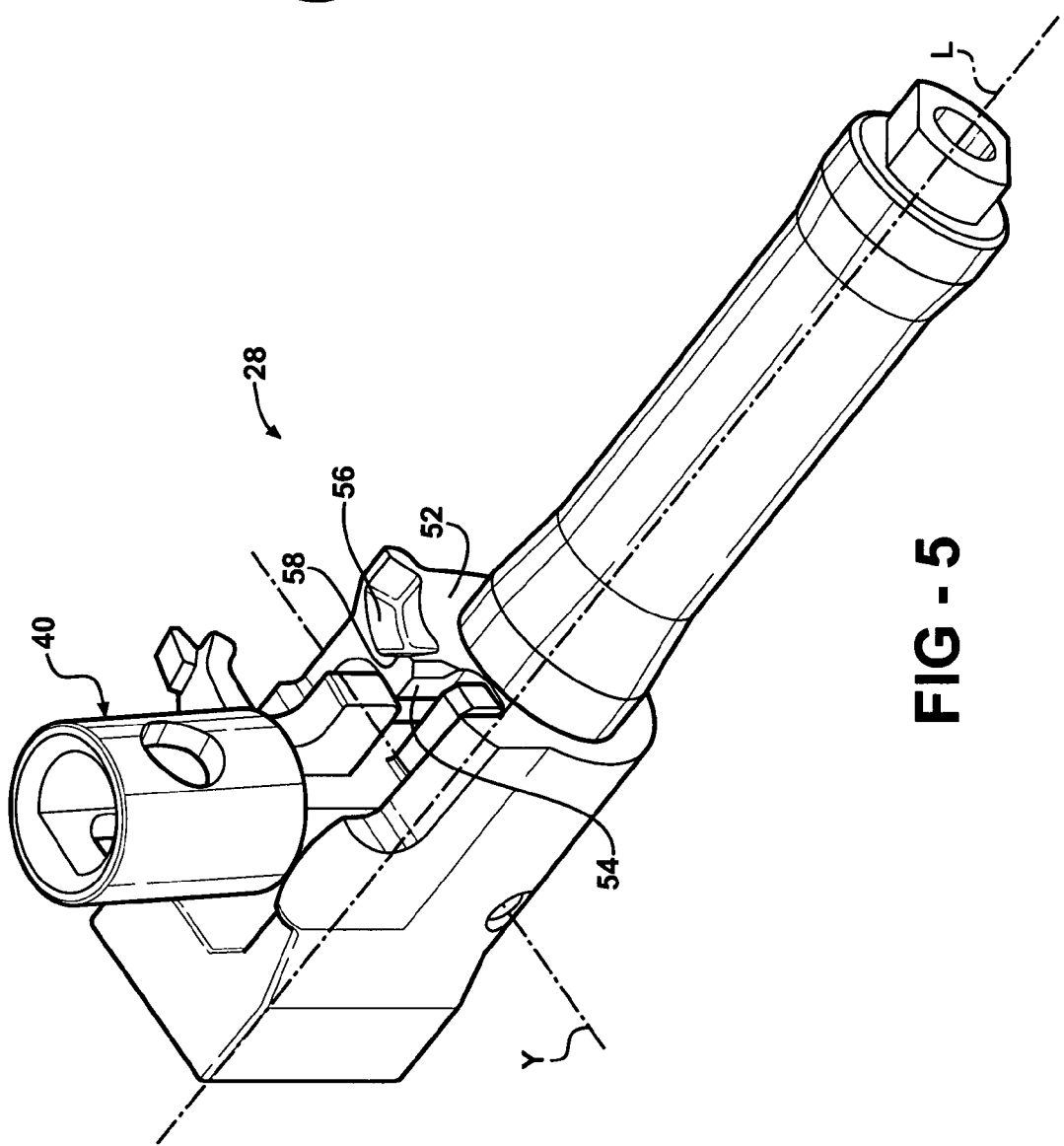
FIG. 5 is a perspective view of the shaft and the transmission shift lever in the restrained position.
Figure 8:
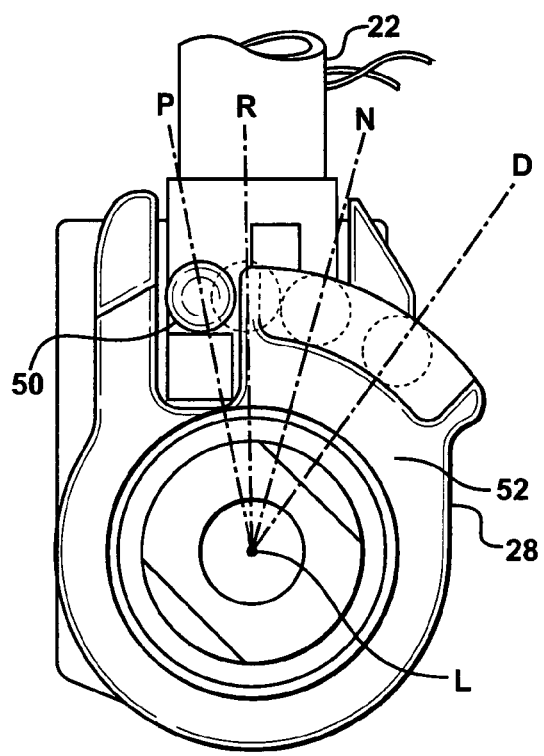
FIG. 8 is a cross sectional view of the shaft and the inhibitor pin shown in FIG. 7.
Figure 9:
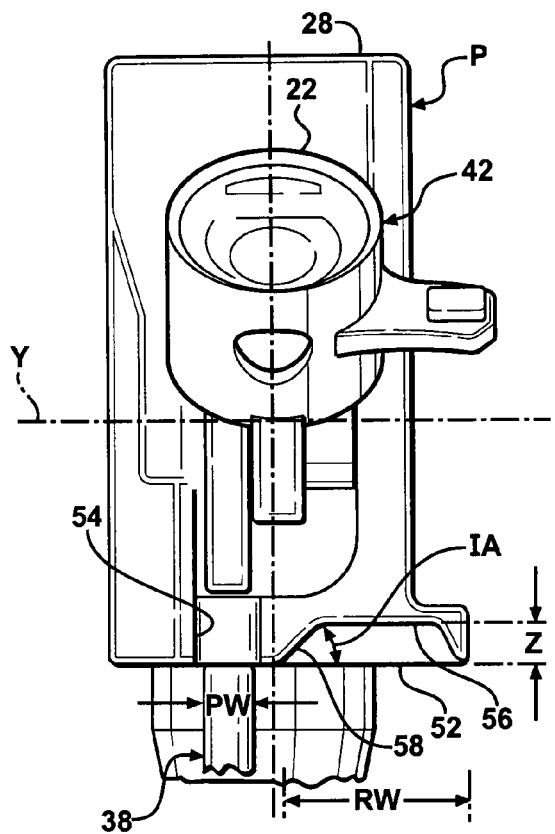
FIG. 9 is a fragmentary plan view showing the shaft in the park position and the inhibitor pin in the unlock position and disengaged from the transmission shift lever in the released position.
Figure 10:
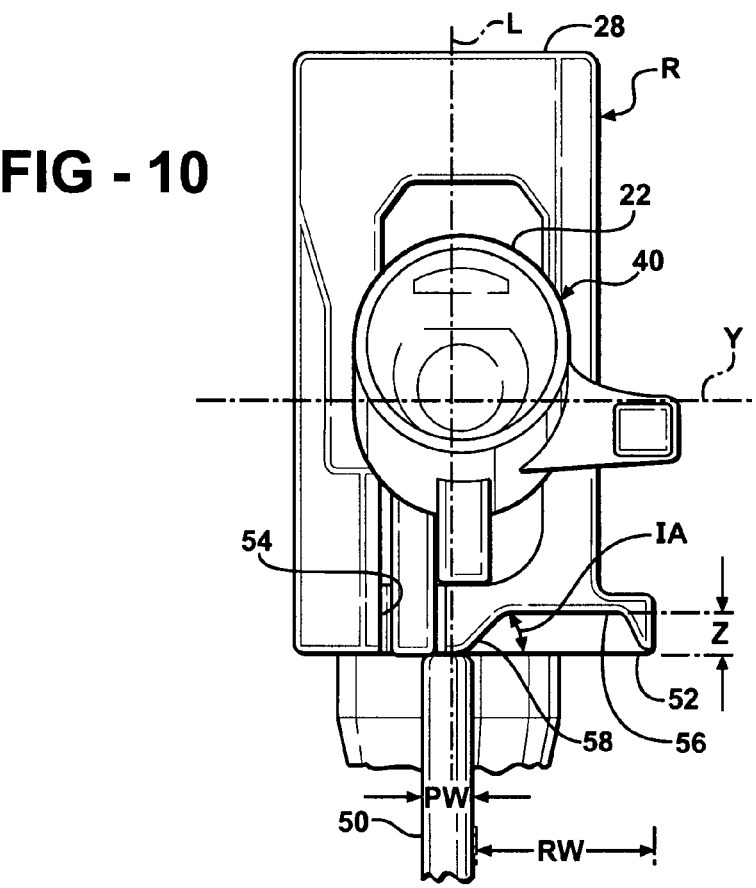
FIG. 10 is a fragmentary plan view showing the shaft in a reverse position and the inhibitor pin in the unlock position and disengaged from the transmission shift lever in the restrained position.
Figure 11:
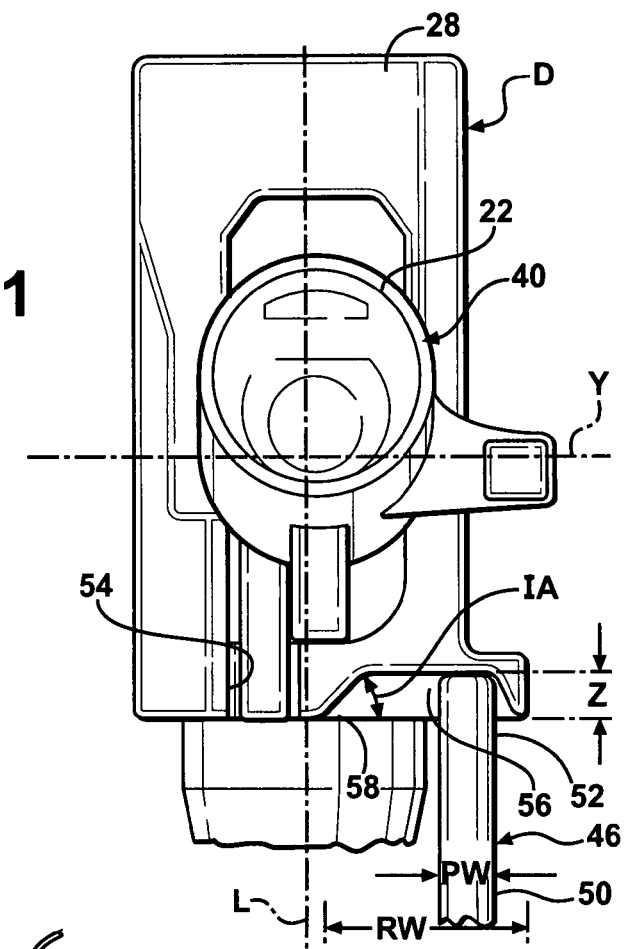
FIG. 11 is a fragmentary plan view showing the shaft in a neutral position and the inhibitor pin in an intermediate position and disengaged from the transmission shift lever in the restrained position.
Figure 12:
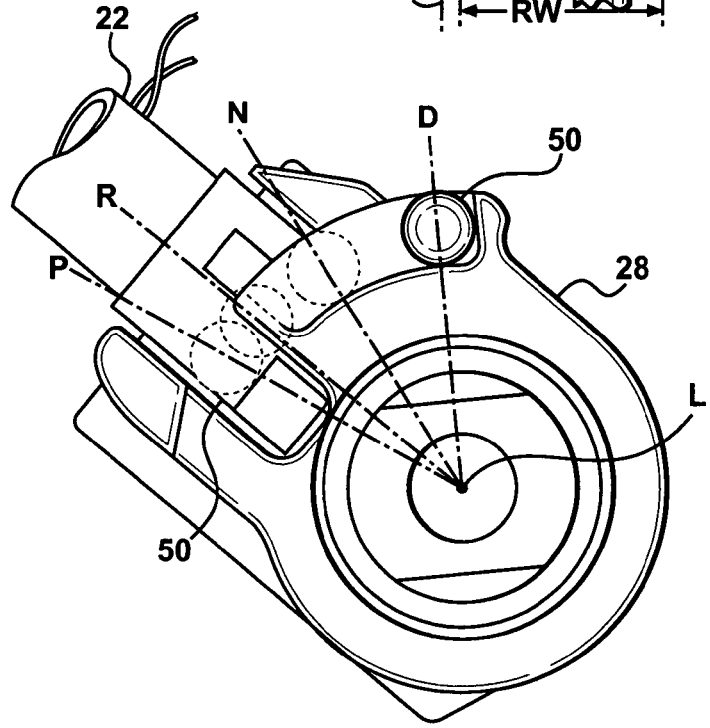
FIG. 12 is a cross sectional view of the shaft and the inhibitor pin shown in FIG. 11.

As best shown in FIGS. 8 and 12 with reference to FIGS. 4 and 5, the shaft 28 defines a longitudinal axis L. The shaft 28 and the transmission shift lever 22 are rotatable about the longitudinal axis L between at least the park position P, a neutral position N, and a drive position D. However, it should be appreciated that the shaft 28 and the transmission shift lever 22 may be rotated into other positions, such as a reverse position R, a first drive gear position, or a second drive gear position. While the number and order of the different positions of the shaft 28 and the transmission shift lever 22 may vary, it should be understood that the park position P of the shaft 28 and the transmission shift lever 22 corresponds to a park position of a transmission of the vehicle. Likewise, the neutral position N and drive position D of the shaft 28 and the transmission shift lever 22 correspond to the neutral position and drive position of the transmission of the vehicle.

As best shown in FIGS. 4 and 5, the transmission shift lever 22 is pivotably coupled to the shaft 28. The transmission shift lever 22 is pivotably moveable between a restrained position 40 and a release position 42 about a pivot axis Y. The shaft 28 and the transmission shift lever 22 are rotatably moveable between the park position P, the neutral position N, and the drive position D when the transmission shift lever 22 is in the release position 42. The shaft 28 and the transmission shift lever 22 are restrained in the park position P when the transmission shift lever 22 is in the restrained position 40. Accordingly, in order to move the transmission shift lever 22 and the shaft 28 between the park position P, the neutral position N, and the drive position D, the transmission shift lever 22 must be pivoted from the restrained position 40 into the release position 42. As is well known in the art, a spring biases the transmission shift lever 22 into the restrained position 40 when not operated by a user.

Referring back to FIG. 6, the ignition switch 26 includes at least the off position 30, the accessory position 32, and a mid position 48 between the off position 30 and the accessory position 32. The mid position corresponds to the range of travel between the off position 30 and the accessory position 32, and does not need to be a specific position in the ignition switch 26. In other words, the mid position represents the "intermittent space" in the switch between the off position 30 and the accessory position 32 where the ignition switch 26 is not positively engaged in either the off position 30 or the accessory position 32. It should be appreciated that the ignition switch 26 may include other positions, such as a start position 34 and a run position 36. The ignition switch 26 is only moveable into the off position 30 when the shaft 28 and the transmission shift lever 22 are in the park position P and the transmission shift lever 22 is in the restrained position 40. Additionally, the ignition switch 26 permits the vehicle to draw an electrical current from an accessory circuit when the ignition switch 26 is in the accessory position 32, the start position 34, or the run position 36.

Referring back to FIGS. 2 and 3 with reference to FIGS. 1, 7, 9, 10, and 11, an inhibitor pin 50 is coupled to the ignition switch 26 and the steering column assembly 20. A push/pull cable 60 interconnects the ignition switch 26 and the inhibitor pin 50. The ignition switch includes a tab 51 that rotates with movement of the ignition switch between the different positions of the ignition switch. The push/pull cable includes a pair of lobes 53 for engaging the tab 51, with the tab 51 engaging one of the pair of lobes 53 when the ignition switch is rotated in a first direction and the tab 51 engaging the other of the pair of lobes 53 when the ignition switch is rotated opposite the first direction. Accordingly, movement of the ignition switch 26 moves the inhibitor pin 50 via the push/pull cable 60, and likewise movement of the inhibitor pin 50 in turn moves the ignition switch 26 via the push/pull cable 60. The inhibitor pin 50 is stationary relative to rotation of the shaft 28 about the longitudinal axis L. The inhibitor pin 50 is moveable along the longitudinal axis L between a lock position 44 and an unlock 38 position. In the lock position 44, the inhibitor pin 50 is engaged with the transmission shift lever 22 when the ignition switch 26 is positioned in the off position 30. In the unlock 38 position, the inhibitor pin 50 is disengaged from the transmission shift lever 22 when the ignition switch 26 is positioned in one of the accessory position 32, the mid position 48, the start position 34, or the run position 36. Disconnection of the accessory circuit, and thereby the interruption of the draw on the electrical current, corresponds with the movement of the inhibitor pin 50 from the unlock 38 position along the longitudinal axis L into the lock position 44.

As best shown in FIGS. 4 and 5, the shaft 28 includes a planar surface 52 disposed transverse to the longitudinal axis L. Referring also to FIG. 7, the planar surface 52 defines a channel 54 extending therethrough, with the inhibitor pin 50 extending through the channel 54 into engagement with the transmission shift lever 22 when in the lock position 44.

As best shown in FIGS. 4 and 5, the shaft 28 defines a recess 56 in the planar surface 52. The recess 56 is laterally spaced from the channel 54. Referring also to FIGS. 7, 9, 10, and 11, the recess 56 is spaced from the planar surface 52 to a pre-determined depth Z. Preferably, the pre-determined depth Z is between the range of 2.95 mm and 3.05 mm, i.e., the recess 56 is 2.95 mm to 3.05 mm deep relative to the planar surface 52 as measured along the longitudinal axis L. It should be understood that the depth Z of the recess 56 must be less than the distance the inhibitor pin 50 extends through the channel 54 of the planar surface 52 so as to continually inhibit removal of the key from the ignition switch 26, shown in FIG. 6, when the shaft 28 and the transmission shift lever 22 are not in the park position P, shown in FIG. 12. Therefore, the inhibitor pin 50 preferably extends into the channel 54 a distance greater than 3.05 mm. The inhibitor pin 50 is moveable into the recess 56 to an intermediate position 46 when the shaft 28 is in one of the neutral position N and the drive position D. The intermediate position 46 is a position between the lock position 44 and the unlock 38 position. Movement of the inhibitor pin 50 into the recess 56 permits interruption, i.e., disconnection, of the electrical current being drawn from the accessory circuit in response to movement of the ignition switch 26 into the mid position 48, shown in FIG. 6. Accordingly, when the shaft 28 and the transmission shift lever 22 are in one of the neutral position N or the drive position D, the ignition switch 26 may be cycled into the mid position 48, thereby moving the inhibitor pin 50 into the recess 56 and disconnecting the accessory circuit. Thus, the inhibitor pin 50 is free to move a distance along the longitudinal axis L equal to the depth Z of the recess 56. Because the depth Z of the recess 56 is less than the distance the inhibitor pin 50 extends through the channel 54 in the lock position 44, the ignition switch 26 is prevented from cycling into the off position 30 and the key is retained in the ignition switch 26, while still permitting disconnection of the accessory circuit.

As best shown in FIGS. 7, 9, 10, and 11 with reference to FIGS. 8 and 12, the inhibitor pin 50 includes a pin width PW and the recess 56 includes a recess width RW greater than the pin width PW. The recess width RW may be customized to accommodate different components having different positions of the shaft 28 and the transmission shift lever 22. More specifically, because different vehicle models often include different transmissions, such as a 4 spd transmission, a 5 spd transmission, or a 6 spd transmission, the recess width RW must be able to accommodate all of the available transmission options. As each different transmission includes a different rotational travel distance when rotated about the longitudinal axis L between the various positions (the park position P, the drive position D, the neutral position N, the reverse position R), the recess width RW must be customizable, i.e., variable, to accommodate the various transmissions. Accordingly, the recess width RW may be adjusted so that the inhibitor pin 50 is moveable into the recess 56 regardless of the type of transmission utilized (4 spd, 5 spd, 6 spd, etc.) so that the shaft 28 may be cycled between the neutral position N and the drive position D for all possible transmission options while the ignition switch 26 is in the mid position 48 and the inhibitor pin 50 is in the intermediate position 46, without activating the accessory circuit.

As best shown in FIGS. 7, 9, 10, and 11, the recess 56 includes a guide ramp 58 angled relative to the planar surface 52. The guide ramp 58 guides withdrawal of the inhibitor pin 50 from the recess 56 and moves the ignition switch 26 back into the accessory position 32 from the mid position 48, thereby re-establishing the draw of electrical current from the accessory circuit. Because the inhibitor pin 50 is connected to the ignition switch 26 via the push/pull cable 60, as shown in FIGS. 2 and 3, rotating the transmission shift lever 22 and thereby the shaft 28 from one of the drive position D or the neutral position N moves the inhibitor pin 50 up the ramp and out of the recess 56. As the inhibitor pin 50 is moved up the ramp and out of the recess 56, the inhibitor pin 50 is also moved from the intermediate position 46 into the unlock 38 position, as well as simultaneously moving the ignition switch 26 from the mid position 48, shown in FIG. 6, to the accessory position 32 without the user manually cycling the ignition switch 26. Movement of the ignition switch 26 into the accessory position 32 re-establishes the accessory circuit permitting draw of the electrical current.

The guide ramp 58 preferably includes an interior angle IA relative to the planar surface 52 between the range of 30° and 45°. However, the interior angle IA may vary from the preferred range if the shape and configuration of the inhibitor pin 50 so accommodate.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An ignition and transmission shift lever interlock system for a vehicle, said system comprising:

a shaft defining a longitudinal axis and rotatable about said longitudinal axis between at least a park position, a neutral position, and a drive position;

a transmission shift lever pivotably coupled to said shaft and pivotably moveable between a restrained position and a release position with said shaft rotatably moveable between said park position, said neutral position, and said drive position when said transmission shift lever is in said release position and said shaft restrained in said park position when said transmission shift lever is in said restrained position;

an ignition switch having at least an off position, an accessory position, and a mid position between said off position and said accessory position wherein said ignition switch is only moveable into said off position when said shaft is in said park position and wherein said accessory position draws an electrical current from an accessory circuit;

an inhibitor pin coupled to said ignition switch and stationary relative to rotation of said shaft about said longitudinal axis and moveable along said longitudinal axis between a lock position engaging said transmission shift lever when said ignition switch is positioned in said off position and an unlock position disengaged from said transmission shift lever when said ignition switch is positioned in said accessory position and said mid position;

said shaft defining a recess with said inhibitor pin moveable into said recess to an intermediate position between said lock position and said unlock position when said shaft is in one of said neutral position and said drive position to permit interruption of the electrical current in response to movement of said ignition switch into said mid position.

2. A system as set forth in claim 1 wherein said shaft includes a planar surface transverse to said longitudinal axis and said recess includes a guide ramp angled relative to said planar surface to guide withdrawal of said inhibitor pin from said recess and move said ignition switch into said accessory position and re-establish the electrical current.

3. A system as set forth in claim 2 wherein said recess is spaced from said planar surface to a pre-determined depth.

4. A system as set forth in claim 3 wherein said pre-determined depth of said recess is between the range of 2.95 mm and 3.05 mm.

5. A system as set forth in claim 3 wherein said planar surface defines a channel with said inhibitor pin extending through said channel past said planar surface when in said lock position a distance greater than said pre-determined depth of said recess.

6. A system as set forth in claim 5 wherein said inhibitor pin extends through said channel past said planar surface when in said lock position a distance greater than 3.05 mm.

7. A system as set forth in claim 5 wherein said recess is laterally spaced from said channel.

8. A system as set forth in claim 2 wherein said guide ramp includes an interior angle relative to said planar surface between the range of 30° and 45°.

9. A system as set forth in claim 1 wherein said inhibitor pin includes a pin width and said recess includes a recess width greater than said pin width.

10. A system as set forth in claim 1 further comprising a push/pull cable interconnecting said ignition switch and said inhibitor pin.

11. A system as set forth in claim 1 wherein said ignition switch includes a key removable only when said ignition switch is in said off position and said shaft is in said park position.

* * * * *